United States Patent [19]

Forman

[11] 4,383,736

[45] May 17, 1983

[54] PRESSURE FORMED FIBER OPTIC CONNECTOR

[75] Inventor: Donald B. Forman, San Diego, Calif.

[73] Assignee: The United States of America as represented by the Secretary of the Navy, Washington, D.C.

[21] Appl. No.: 210,114

[22] Filed: Nov. 24, 1980

[51] Int. Cl.³ .............................................. G02B 7/26
[52] U.S. Cl. .................... 350/320; 29/871; 350/96.21
[58] Field of Search ............. 350/96.20, 96.21, 96.22, 350/320; 29/871

[56] References Cited

U.S. PATENT DOCUMENTS

| | | | |
|---|---|---|---|
| 3,944,328 | 3/1976 | Kent et al. | 350/96.21 |
| 3,982,815 | 9/1976 | Nakayama | 350/96.21 |
| 3,996,526 | 12/1976 | d'Auria et al. | 331/94.5 S |
| 4,107,242 | 8/1978 | Runge | 264/1 |
| 4,123,138 | 10/1978 | Morrison | 350/96.21 |
| 4,148,553 | 4/1979 | Asam | 350/96.21 |
| 4,166,672 | 9/1979 | Gilbert | 350/96.20 |
| 4,168,109 | 9/1979 | Dumire | 350/96.22 |
| 4,173,389 | 11/1979 | Curtis | 350/96.20 |
| 4,178,067 | 12/1979 | Johnson et al. | 350/96.21 |
| 4,183,616 | 1/1980 | Benoit et al. | 350/96.20 |
| 4,205,896 | 6/1980 | Borsuk | 350/96.20 |
| 4,205,897 | 6/1980 | Stankos | 350/96.21 |
| 4,352,542 | 10/1982 | Tydings | 350/96.21 |
| 4,353,620 | 10/1982 | Schultz | 350/96.21 |

FOREIGN PATENT DOCUMENTS 1555475 11/1979 United Kingdom ............ 350/96.21

*Primary Examiner*—John D. Lee
*Attorney, Agent, or Firm*—Robert F. Beers; Ervin F. Johnston; Terrance A. Meador

[57] ABSTRACT

A connector for holding and aligning optical fiber waveguides is produced by subjecting a tube encompassing a wire mandrel to a high-energy forming process which forms the tube into an arcuate shape having a bore for receiving the ends of the waveguides.

4 Claims, 7 Drawing Figures

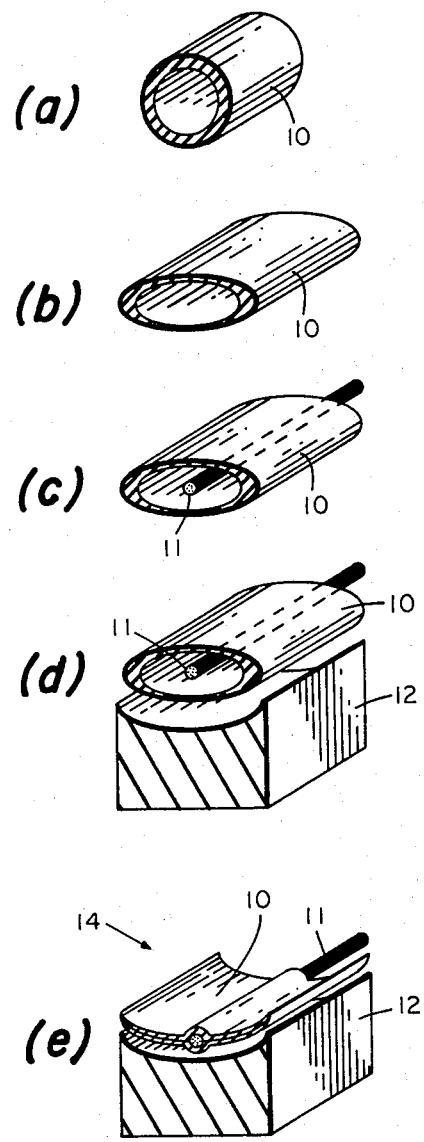
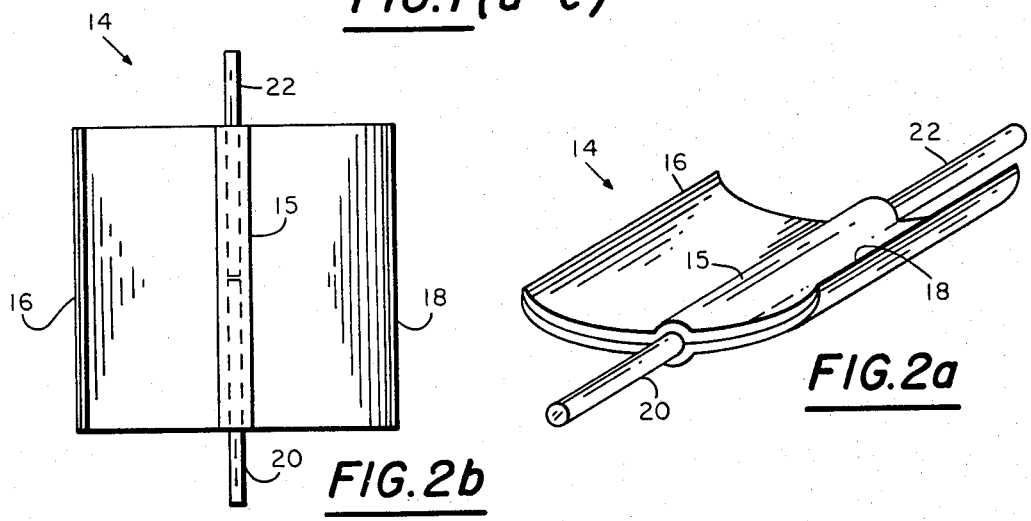
FIG.1(a-e)
FIG.2a
FIG.2b

PRESSURE FORMED FIBER OPTIC CONNECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is in the class of apparatuses used for holding and aligning the ends of optical fiber waveguides. More particularly, it is in the class of optical waveguide connectors made from deformable materials.

In the existing art, connectors used for holding and aligning the ends of optical fiber waveguides are produced from either metallic or synthetic materials. In either case, extremely tight dimensional tolerances are required in order to align waveguides having very small dimensions. Classically, in metal connectors the tight dimensions and tolerances are achieved by precision machining of sleeves, grooves, bores or rods. Other methods include thermal deformation of eutectic or Martensitic material or casting. High precision plastic connectors are produced by various molding processes. Optical waveguides are held in alignment in the metallic connectors by crimping, thermal bonding, epoxying, or clamping. The preferred methods for holding optical waveguides in connectors produced from synthetic material are thermal deformation or adhesion. Most of these securing techniques are not reversible and result in damage to waveguides when the connectors are disassembled.

The utility of prior art metal connectors is limited by the methods of manufacturing and assembling them. Casting and precision machining are inherently expensive processes, and connectors produced by these methods require auxiliary tools for assembly. The connectors produced by thermal deformation techniques are either not reuseable in the case of eutetic material or require a heat source for disassembly in the case of Martensitic material. While the connectors produced from synthetic material do provide excellent performance characteristics, they are limited in application to benign environments where temperature and humidity are strictly controlled. Metallic connectors, on the other hand, can be employed in a variety of malign environments.

The present invention is a metallic connector for optical fiber waveguides has the small, precise dimensions necessary to waveguide alignment and which demountably holds the waveguides in alignment without the requirements for assembly tools or bonding materials. The connector can be reproducibly manufactured in high volume by use of an inexpensive production technique.

SUMMARY OF THE INVENTION

In accordance with the apparatus and method of the present invention, a connector for aligning and holding optical fiber waveguides is composed of an arcuately shaped flexible member formed from two nested, arcuate sheets joined at their edges which correspond to the ends of the arcs. The connector has a circular, longitudinal bore formed from two oppositely curving depressions, each depression being in a respective nested sheet.

OBJECTS OF THE INVENTION

It is an object of the present invention to provide a dimensionally precise optical fiber connector which demountably holds a pair of optical fibers in alignment.

It is another object of the present invention to provide an optical fiber connector from which fibers can be easily extracted without damage or use of tools.

It is also an object of the present invention to provide a dimensionally precise optical waveguide connector which can be manufactured by a highly reproducible, inexpensive, high volume process.

Other objects and advantages of this invention will become clear from the following detailed description of the preferred embodiment, and the novel features will be particularly pointed out in the appended claims.

BRIEF DESCRIPTION OF THE DRAWINGS

FIGS. 1a through 1e are illustrations of the steps required in the process of manufacturing this invention.

FIGS. 2a and 2b are perspective views of this invention.

DESCRIPTION OF THE PREFERRED EMBODIMENT

Referring now to FIG. 1, there is represented a series of steps which comprise a method for manufacturing an optical fiber connector. In FIG. 1a a tube 10 composed of a deformable metallic material is provided. The tube is deformed into a regular shape, herein an oval, in step b, and in step c a stainless steel wire mandrel 11 is placed within the tube. In step d the tube 10 with the mandrel 11 is placed upon a tooling form 12. After step d, a high-energy-rate forming force is applied to cold-work the tube 10. In step e the effect of the application of the high-energy-rate forming force to the tube 10 is shown. The tube 10 has been formed to conform to the arcuate shape of the workform 12. The mandrel 11 has caused the formed tubular workpiece 10 to assume a localized, cylindrical shape which, when the mandrel is removed, constitutes a bore extending from one end of the workpiece to the other. The workpiece now has characteristics which allow it to be utilized as a fiber optic connector 14.

In FIG. 2a and 2b the formed fiber optic connector 14 is shown as an arcuately shaped member having a leg 16, a leg 18, and a longitudinal cylindrical bore 15 in which the ends of two optical fiber waveguides 20 and 22 are held. The ends of the optical fibers 20 and 22 are inserted into or extracted from the bore 15 by grasping and flexing the two legs 16 and 18. Selection of a material for the tube 10 having a stable spring coefficient will ensure that the connector 14 will reassume its formed shape when the legs 16 and 18 are released. Thus, the connector 14 constitutes a spring loaded, reuseable alignment fixture for optical fiber waveguides.

The performance characteristics of the connector 14 are determined by selection of the mandrel 11 and the uniformity of the forming process. Dimensionally precise stainless steel wires of various diameters are useable as the mandrel in the forming process. The diameter of the mandrel will determine the diameter of the bore 15 and, consequently, the outer diameter of the fibers to be aligned. The high-energy-rate forming technique selected to produce the arcuately shaped connector 14 can be one which uniformly deforms the tube 10. Techniques such as electro-magnetic forming, electro-hydraulic forming, and hydroforming are examples of high-energy-rate cold working techniques which may be used in the method described hereabove. These cold working techniques permit the connector material to be selected from a large group of malleable metals including, but not limited to, brass, copper, steel, both low carbon and stainless, and aluminum.

It is of course to be understood that the embodiment and method of the present invention hereinabove discussed are illustrative of an even wider variety of embodiments useful in practicing the invention. In all cases the scope of the invention is to be interpreted as defined by the appended claims.

What is claimed is:

1. A method of fabricating an apparatus for holding and aligning a pair of aligned optical fibers, comprising the steps of:
   providing an annular tube of deformable material, the deformable material is a metal having a stable spring coefficient;
   preforming the tube into an oval cross-sectional shape;
   inserting a mandrel of predetermined dimensions within the oval-shaped tube;
   placing the oval tube and inserted mandrel into an arcuately concave mold;
   forming the tube by a high energy process, such as cold working into two arcuately-shaped nested sheets having a circular cross-sectional, longitudinal bore where the nested sheets have been formed around the mandrel; and
   removing the mandrel.

2. A method of fabricating an apparatus for holding and aligning a pair of aligned optical fibers, comprising the steps of:
   providing an annular tube of deformable material, the deformable material is a metal having a stable spring coefficient;
   preforming the tube into an oval cross-sectional shape;
   inserting a mandrel of predetermined dimensions within the oval-shaped tube, the mandrel is a hardened steel wire;
   placing the oval tube and inserted mandrel into an arcuately concave mold;
   forming the tube by a high energy process, such as cold working into two arcuately-shaped nested sheets having a circular cross-sectional, longitudinal bore where the nested sheets have been formed around the mandrel; and
   removing the mandrel.

3. A method as in claim 2 wherein the forming is electromagnetic cold forming.

4. A method as in claim 2 wherein the forming is hydroforming.

* * * * *